Figure 1:
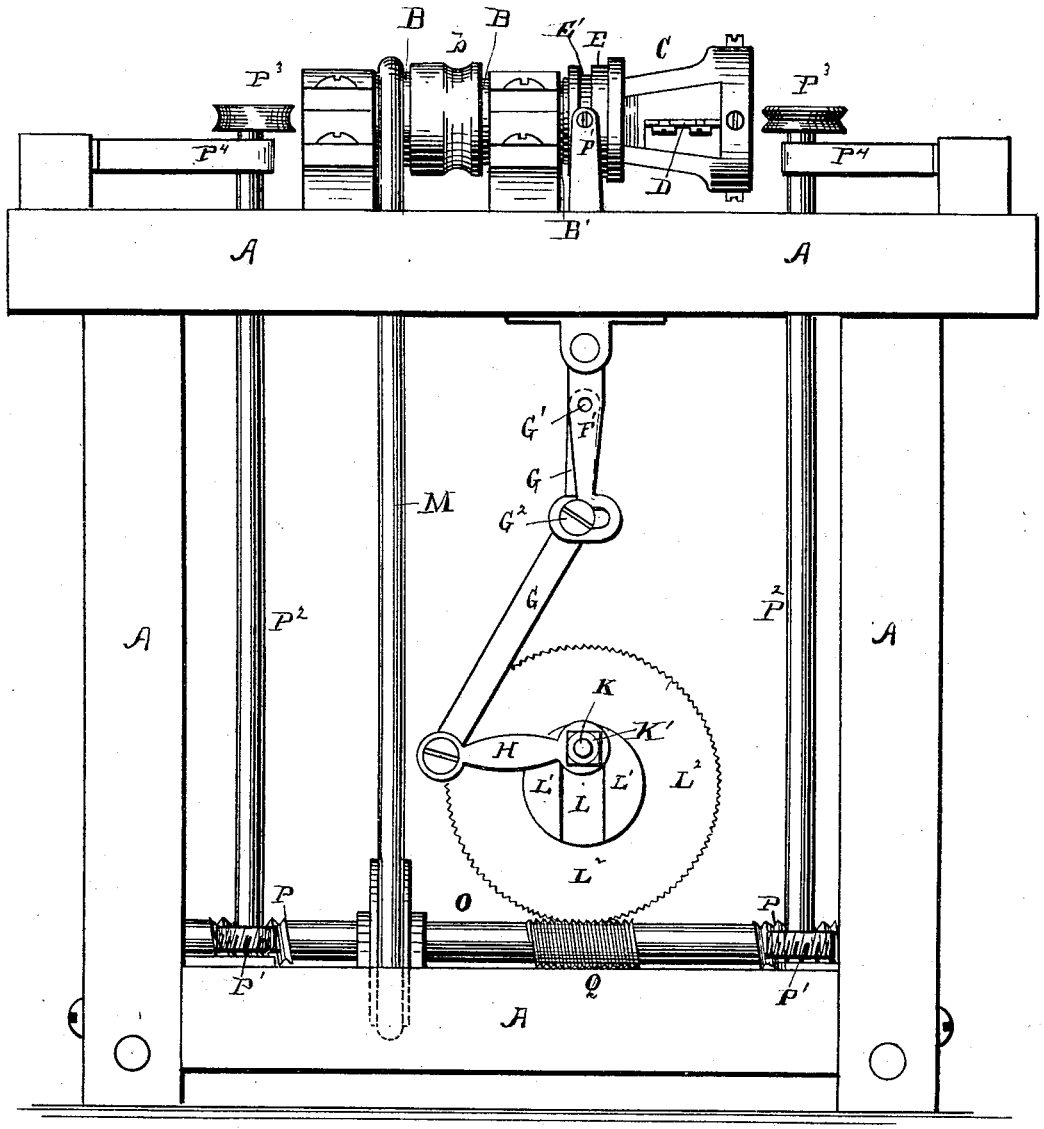

(No Model.) 3 Sheets—Sheet 1.

N. T. MELVIN.
MACHINE FOR TURNING CYLINDRICAL OR TAPERING HANDLES.

No. 254,492. Patented Mar. 7, 1882.

WITNESSES
Frank M. Faber
William Ed. Connelly

INVENTOR
A. T. Melvin.
By Leggett & Leggett
ATTORNEY (No Model.) 3 Sheets—Sheet 2.
N. T. MELVIN.
MACHINE FOR TURNING CYLINDRICAL OR TAPERING HANDLES.
No. 254,492. Patented Mar. 7, 1882.
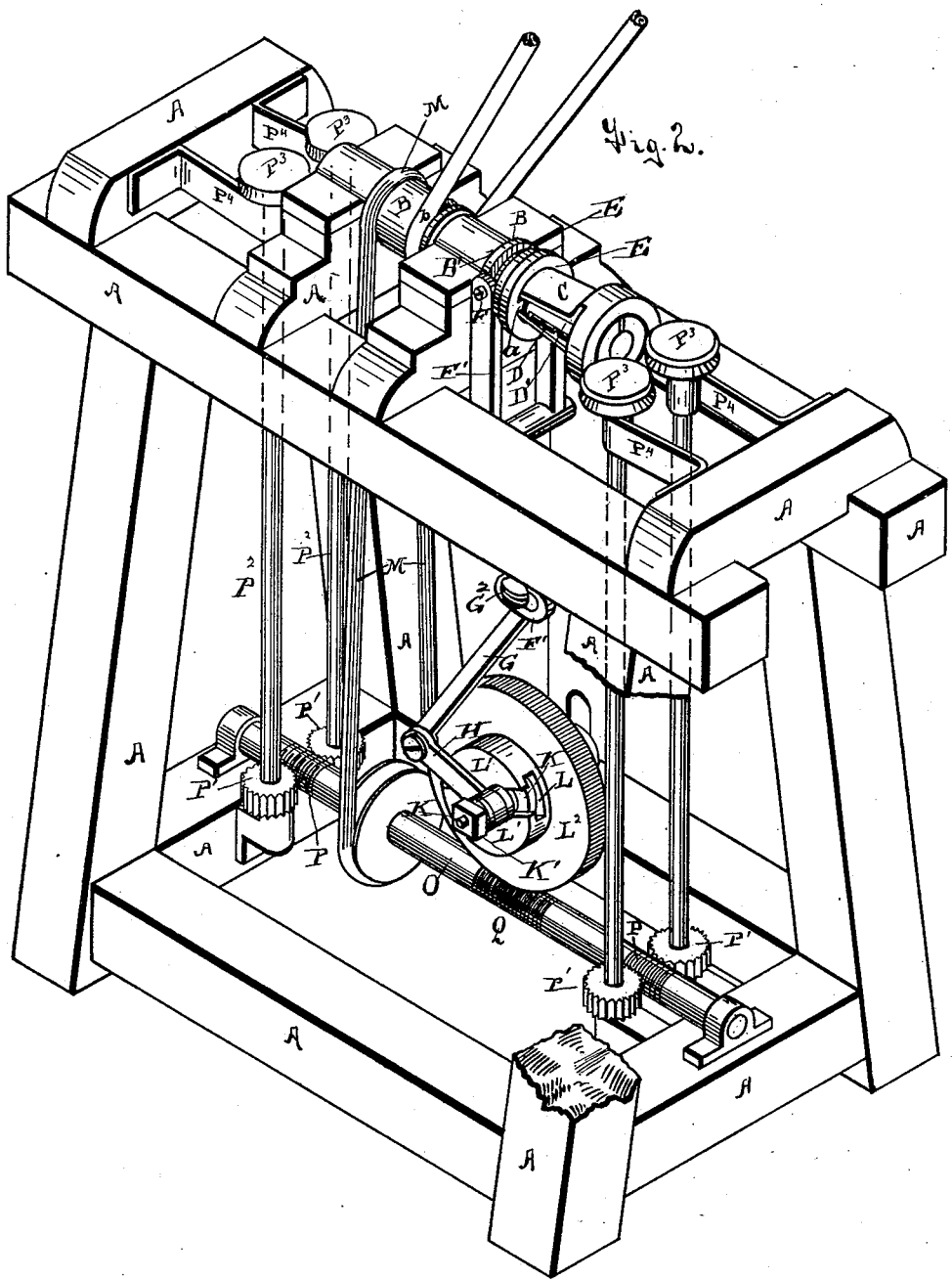
WITNESSES
Frank M. Faber
W. E. Connelly
INVENTOR
N. T. Melvin.
By Leggett & Leggett
ATTORNEY.

(No Model.) 3 Sheets—Sheet 3.
N. T. MELVIN.
MACHINE FOR TURNING CYLINDRICAL OR TAPERING HANDLES.
No. 254,492. Patented Mar. 7, 1882.
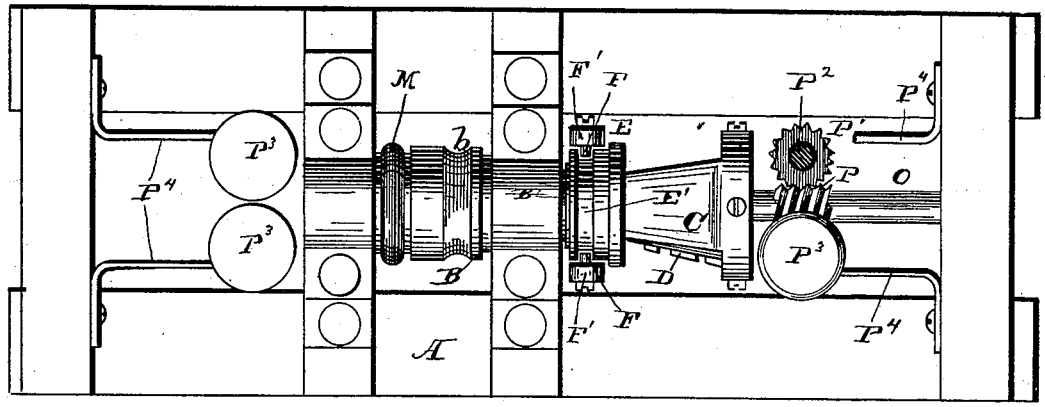
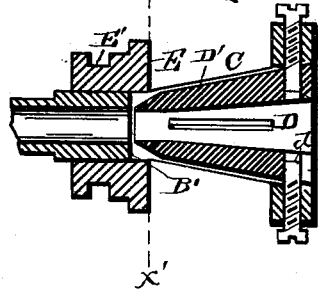
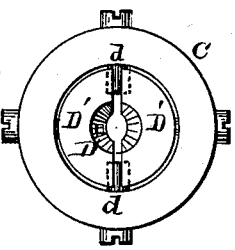
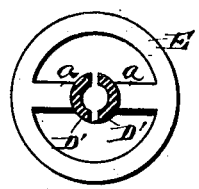
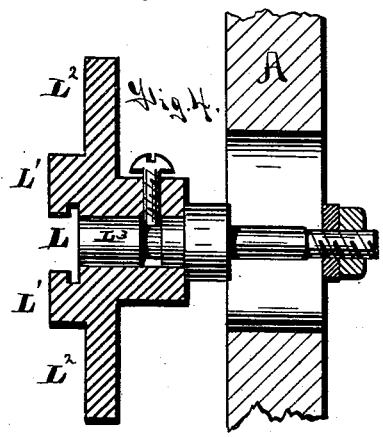
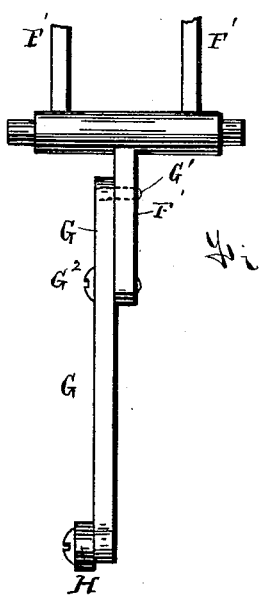
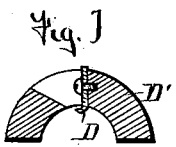
WITNESSES
INVENTOR
ATTORNEYS

UNITED STATES PATENT OFFICE.

NATHAN T. MELVIN, OF LODI, OHIO, ASSIGNOR TO HIMSELF AND ALBERT B. TAYLOR, OF SAME PLACE.

MACHINE FOR TURNING CYLINDRICAL OR TAPERING HANDLES.

SPECIFICATION forming part of Letters Patent No. 254,492, dated March 7, 1882.

Application filed April 26, 1880. (No model.)

*To all whom it may concern:*

Be it known that I, NATHAN T. MELVIN, of Lodi, in the county of Medina and State of Ohio, have invented certain new and useful Improvements in Machinery for Turning Cylindrical and Tapering Handles; and I do hereby declare the following to be a full, clear, and exact description of the invention, such as will enable others skilled in the art to which it pertains to make and use it, reference being had to the accompanying drawings, which form part of this specification.

My invention relates to machinery for turning cylindrical or tapering handles for brooms, rakes, hoes, curtain-rollers, and the like.

In the drawings, Figure 1 is a side elevation of a device constructed according to my invention. Fig. 2 is an isometric view thereof with a portion of the frame removed to show the working parts. Fig. 3, $a\,b\,c$, are detached views, showing the cutter-head and tapering collar; Fig. 4, a detached view, showing the manner of vertically adjusting the worm-gear wheel which operates the tapering mechanism. Fig. 5 is a plan view. Fig. 6 is a detached view of a portion of my device, and Fig. 7 is a detached view of one of the swinging holders with the cutting-blade secured thereto.

My invention consists in the means, substantially as hereinafter specified, whereby the same machine can be adjusted to turn either a cylindrical stick or a stick of any degree of taper; also, in the means for adjusting said machine to cut a cylindrical or tapering stick; also, in the feeding mechanism and the manner of operating said mechanism; and, finally, in the general construction and arrangement of parts, as herinafter specified.

In the said drawings, A is a frame suitably constructed from appropriate material, and made of any convenient style and proportions to hold and accommodate the various parts of my device.

Driving power may be applied in any convenient manner whatever, and in this respect I do not in any degree limit my invention. The device illustrated in the drawings, however, has its initial driving power applied to the hollow shaft B at $b$. To the end B' of the hollow shaft B is attached the cutter-head C. This cutter-head widens toward the end of the shaft into a conical or bell-shaped fashion, substantially as illustrated. Within this cutter-head are located and adjusted two cutting-blades, D, having turned or feathered cutting-edges. These knives are adjusted a distance apart from each other corresponding to the thickness or diameter of the stick to be turned. These cutting-blades are attached to swinging holders D', which latter are pivoted at $d$ to the enlarged outer end of the cutter-head C, the other or small end of said holders D' being left free to swing to the limit fixed by the collar E, which surrounds the cutter-head C at its rear end, and which revolves with said cutter-head. This collar E is provided with studs or fingers $a$, adapted to move over the inclined or tapering outer surfaces of the swinging holders D' and force them nearer together, thereby diminishing the distance between the cutting-edges of the blades D at the small or rear end of the cutter-head. The collar E is permitted a slight longitudinal sliding movement over the small end of the cutter-head C, and is provided with studs, or their equivalent, which impinge against the outside tapering bodies of the swinging holders D'. An annular groove, E', is formed upon the collar E, within which fit the bosses F. These bosses are attached to or form a part of a lever, F', pivoted to the frame A. This lever is attached at its lower end to an adjustable connection, G.

My manner of constructing and associating the lever F' and connection G is peculiar, and is as follows: The lower arm of the lever F' is provided with a longitudinal slot, through which passes a binding-screw, G², engaging with the adjustable connection G, and above this slot and set-screw connection a pin, G', passes through both the lever F' and connection G. In order to adjust the connection G and lever F' in their proper relation to each other, the set-screw is loosened, the connection G moved (swinging upon the pin G') until properly adjusted, when it is fixed in position by tightening the set-screw G². The end of the connection G is attached through the link H to an adjustable wrist-pin, K. This adjustable wrist-pin is made movable in a slot, L, formed in the hub L' of the worm-gear wheel L².

By loosening the nut K' the wrist-pin K can be moved so as to be adjusted either concentrically or eccentrically upon the wheel L². It is adjusted concentrically when a cylindrical stick is to be turned by the machine, and more or less eccentrically when a tapering stick is to be made, the more eccentric the more abrupt the taper, and vice versa. The shaft L³ of the wheel L² is vertically adjustable upon the frame A, and is made so in the slot-and-screw arrangement shown, or in any other suitable manner.

Upon the hollow shaft B is placed a pulley or belt-groove for driving the belt M, through which rotary motion is imparted to the lower shaft, O.

Upon the shaft O are formed or attached three screw-threads, P, P, and Q. The threads P P engage with two pairs of worm-gear wheels, P' P', which are fixed to shafts P², upon the upper ends of which are fixed a pair of feed-wheels, P³ P³. These feed-wheels, with their driving mechanism, as just specified, are placed one in front of the cutter-head C and one at the point where the finished stick emerges from the machine, and, operating together at the same velocity, they act to feed the stick through the machine. The upper ends of the shafts P² are journaled in spring-bearings P⁴, which will permit the feed-wheels P³ to spring out sufficiently to accommodate themselves accurately to sticks of different or irregular diameters. The screw-thread Q engages with the worm-gear L² for operating the tapering collar E.

The operation of my device is as follows: The blank or rough stick is fed into the cutter-head C, being received and driven forward by the feed-wheels P³ in front. As it proceeds through the cutter-head it is acted upon by the blades D, and thereby rounded. If the wrist-pin K is adjusted to the center of the wheel L², there will be no longitudinal movement imparted to the collar E, and the stick will be turned without taper. If, however, a tapering stick is to be produced, the pin K is adjusted eccentrically upon the wheel L², and now, as the wheel L² revolves, the movement of the wrist-pin K will gradually slide the collar E forward toward the expanded or feeding end of the cutter-head C, and as the collar thus moves it impinges against the tapering backs of the cutting-blade holders D', so that as it moves forward it causes the cutting-blades to approach each other, thus gradually diminishing the diameter of the stick being turned by bringing the blades into closer proximity with each other.

I would mention that the cutting-blades D are detachably attached to their holders D', so that, as necessary, they may be removed for replacement, sharpening, or repair.

By the use of my machine cylindrical sticks of any diameter can be readily turned, and the cutters easily adjusted therefor by throwing out of connection the worm-gear wheel L² and setting the collar E to the proper position along the cutter-head C.

What I claim is—

1. The combination, with the cutter-head, of tapering knife-holders pivoted therein, and a sliding collar having internal bosses adapted to bear on said knife-holders, and provided with means for sliding said collar to turn articles of tapering form and for holding said collar stationary when articles of cylindrical form are to be turned, substantially as described.

2. The combination, with the sliding collar and cutter-head having pivoted knife-holders, of the adjustable wrist-pin, worm-wheel, and suitable connecting levers and links, substantially as described.

3. The combination, with the shafts B and O, the cutter-head, and annularly-grooved collar, of the worm-wheel, lever F, having a boss-bearing in the groove of the collar, an adjustable wrist-pin, K, and suitable connections, said wrist-pin being adapted to be adjusted both concentrically and eccentrically to said wheel, substantially as set forth.

4. The combination, with the shafts B and O, the collar E, the cutter-head provided with pivoted knife-holders and knives, of worm-gear Q L², the adjustable wrist-pin K, link H, lever G, pivoted, as described, to the slotted lever F', and the latter provided with the boss F, the whole constructed to cause the knives to approach and recede from each other, substantially as described.

In testimony whereof I have signed my name to this specification in the presence of two subscribing witnesses.

NATHAN T. MELVIN.

Witnesses:
   JNO. CROWELL, Jr.,
   WILLARD FRACKER.